US012104770B1

(12) United States Patent
Rashidi Doust

(10) Patent No.: US 12,104,770 B1
(45) Date of Patent: Oct. 1, 2024

(54) ADJUSTABLE DOWNLIGHT

(71) Applicant: Elite Lighting, Commerce, CA (US)

(72) Inventor: Hamid Rashidi Doust, Beverly Hills, CA (US)

( * ) Notice: Subject to any disclaimer, the term of this patent is extended or adjusted under 35 U.S.C. 154(b) by 0 days.

(21) Appl. No.: 18/442,005

(22) Filed: Feb. 14, 2024

Related U.S. Application Data

(60) Provisional application No. 63/460,841, filed on Apr. 20, 2023.

(51) Int. Cl.

| | |
|---|---|
| ***F21V 19/02*** | (2006.01) |
| ***F21S 8/02*** | (2006.01) |
| ***F21V 21/04*** | (2006.01) |
| ***F21V 29/76*** | (2015.01) |
| ***F21V 29/77*** | (2015.01) |

(52) U.S. Cl.

CPC .............. *F21V 19/02* (2013.01); *F21S 8/026* (2013.01); *F21V 21/049* (2013.01); *F21V 29/763* (2015.01); *F21V 29/773* (2015.01)

(58) Field of Classification Search

CPC ....................................................... F21V 21/30

See application file for complete search history.

(56) References Cited

U.S. PATENT DOCUMENTS

| | | | | |
|---|---|---|---|---|
| 7,559,677 | B1 * | 7/2009 | Dupre | F21V 21/30 362/372 |
| 11,435,062 | B2 * | 9/2022 | Fiegener | F21V 19/02 |
| 2010/0110698 | A1 * | 5/2010 | Harwood | F21V 21/04 362/372 |
| 2015/0241039 | A1 * | 8/2015 | Fryzek | F21S 8/026 362/419 |
| 2016/0186967 | A1 * | 6/2016 | Mathews | F21V 21/30 362/372 |
| 2020/0348001 | A1 * | 11/2020 | Spicer | F21K 9/20 |

* cited by examiner

*Primary Examiner* — Eric T Eide

(74) *Attorney, Agent, or Firm* — Payam Moradian

(57) ABSTRACT

Provided is a downlight comprising: an optics housing configured to receive a source of light; a support for holding the optics housing in position; a vertical track configured for the support to move along in a vertical direction; an angled track attached to the vertical track and configured to move the support from a horizontal orientation to an angled orientation; and a frame with an aperture positioned below the support; wherein position of the optics housing is configured to change relative to the aperture in a vertical direction and a vertical axis.

19 Claims, 8 Drawing Sheets

ADJUSTABLE DOWNLIGHT

CROSS-REFERENCE

The present application claims the benefit of U.S. Provisional application No. 63/460,841, filed on May 1, 2023, which is incorporated herein by reference in its entirety.

BACKGROUND SECTION OF THE INVENTION

Optic lights project light in a certain direction. A problem with these lights is that the projected light is often blocked. There is a need in the art for an optic light that projects light without blockage.

SUMMARY SECTION OF THE INVENTION

Provided is a downlight comprising: an optics housing configured to receive a source of light; a support for holding the optics housing in position; a vertical track configured for the support to move along in a vertical direction; an angled track attached to the vertical track and configured to move the support from a horizontal orientation to an angled orientation; and a frame with an aperture positioned below the support; wherein position of the optics housing is configured to change relative to the aperture in a vertical direction and a vertical axis. The vertical track and the angled track can be slidably attached to each other. The angled track can have two tracks. The support can be a heat sink. The vertical track can have multiple positions for adjusting the position of the support. The bottom of the optics housing can be configured to move below the frame. The bottom of the optics housing can be configured to move below the frame by at least one inch. The bottom of the optics housing can be positioned next to a ceiling material. The optics housing can be positioned at zero to 40 degrees relative to the vertical. The support can be attached to a disc, the disc configured to allow the support to rotate 360 degrees. The trim can be attached to the aperture of the frame. The support can have an upper and the lower portion, with the vertical tracks attached to the upper portion, and the optics housing attached to the lower portion. The angled track can be comprised of two tracks, the two tracks having different lengths and angles. The vertical track can have receivers at fixed positions to receive a ball bearing. The angled track can have an inner and an outer track that have different lengths. The angled track can be anchored to a disc, the disc held in place by a ring and the optics housing configured to rotate in relation to the frame.

Provided is a downlight comprising: an optics housing; a source of light placed inside of the optics housing; a heat sink attached to a top of the optics housing; a vertical track attached on each side of the heat sink configured for the heat sink to move along in a vertical direction; an angled track with an inner and an outer track attached to the vertical track, the vertical track configured to move along the angled track; and a disc attached to the angled track; and a frame with an aperture rotatably attached to the disc. A bottom of the optics housing is configured to be positioned above and below the frame by at least 0.5 inch. The vertical track and the heat sink can be adjusted relative to each other with a ball bearing.

Provided is a downlight comprising: an optics housing; a source of light placed inside of the optics housing; a support for holding the optics housing in position; a first member configured for the support to move against in a vertical direction; a second member configured to move the support from a horizontal orientation to an angled orientation; and a frame with an aperture positioned below the support; wherein position of the optics housing is configured to change relative to the aperture.

DETAILED DESCRIPTION OF THE INVENTION

Provided is an adjustable downlight light fixture configured to both adjust at an angular and in a vertical fashion. The adjustability of the downlight allows for positioning the downlight at different positions without creating a shadow against the trim and the thickness of the ceiling, and further allows extending the optics housing of the downlight below the frame level.

Figure 1:
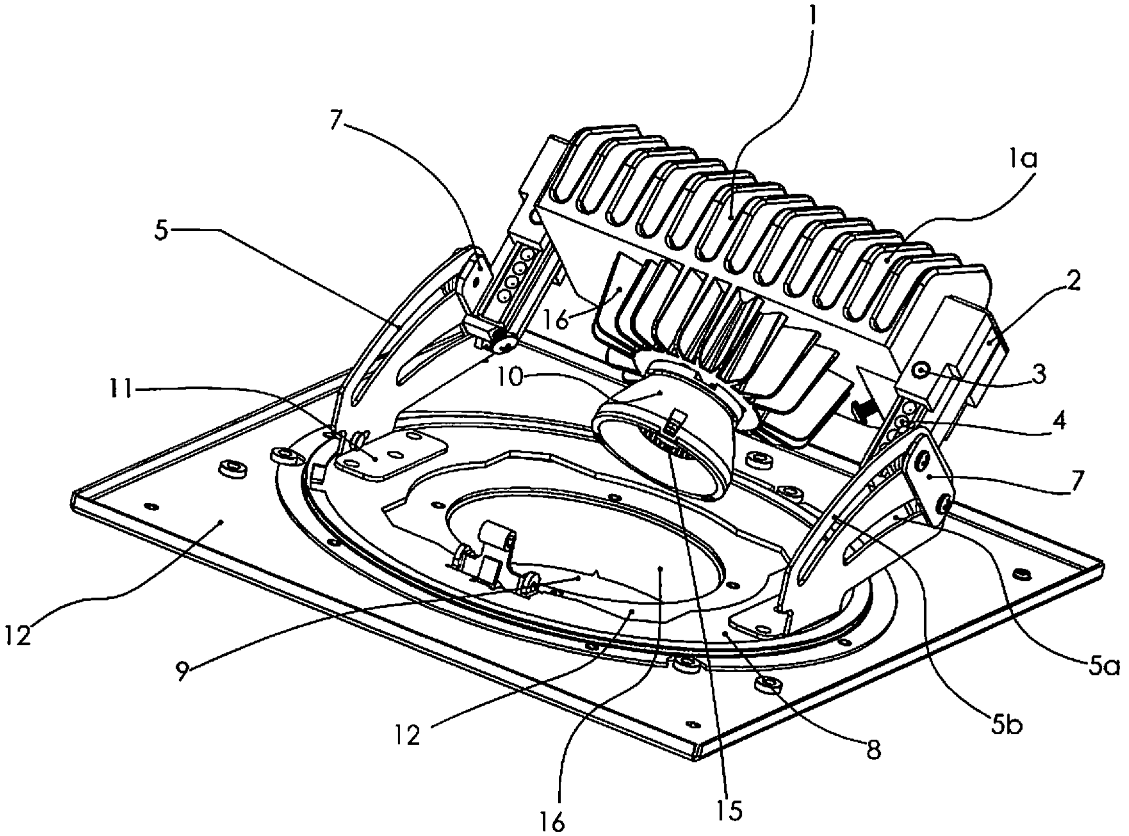
FIG. 1 illustrates a perspective view of the downlight with both tracks at maximum top levels.

FIG. 1 illustrates a perspective view of the downlight with both tracks at maximum top levels. The tracks are paths for movement. The top of optics housing 10 is attached to the bottom portion 1*b* of heat sink 1. A source of light, such as LED light 8 and optics are placed in optics housing 10. Another form of support can be used in place or in combination with heat sink 1. Heat sink 1 is typically made from a metal, such as aluminum. Heat sink 1 can have fins for dissipation of heat.

The upper portion 1*a* of heat sink 1 is movably attached to vertical track 2 on both sides of the upper portion 1*a*. Heat sink 1 only moves in a vertical fashion in relation to vertical track 2. Heat sink 1 can have a plurality of vertical positions in relation to vertical track 2. The vertical track 2 can have receivers 4 positioned at regular intervals, such as at 1 cm intervals. The receiver 4 is typically spherical shaped (inside half). The receiver 4 receives the ball bearing 3 that is fixably attached (does not move in relation) to heat sink 1.

The ball bearing 3 has a spring mechanism that locks into receiver 4. A user can by hand apply sufficient force to move the ball bearing 3 from one receiver 4 position to another. As illustrated, the vertical track 2 has can have five receivers 4, and is configured to allow vertical movement of 4 cm.

The vertical track 2 is movably attached to the lower track 5. The lower track 5 has a curved inner track 5*a* and an outer track 5*b*. A slider 7 attached to the vertical track 2 slides against the lower track 5 and can be attached to different locations on the lower track 5. As illustrated, the vertical track 2 can be positioned at 8 to 9 different locations on the lower track 5. The slider 7 can have two members (such as a fasteners, screws) that slide along the curved tracks of the inner 5*a* and the outer lower track 5*b*. The outer track 5*b* can be longer than the inner track 5*a*. When positioned at the bottom of the lower track 5*a*, the slider 7 can have a horizontal orientation. The orientation of the slider 7 becomes increasingly vertical as the slider 7 moves up along the lower track 5*a*.

The slider 7 can have a spring mechanism, such as with a ball bearing, that attaches to the receivers 6 on the track 5. The track 5 is curved. The curve of the lower track 5 allows the optics housing to be positioned at an angle of zero to 40 degrees, typically from zero to forty degrees in relation to the vertical.

The bottom of the track 5 is fixably attached to disc 8 through anchor 11. A frame 12 with an aperture 9 can be placed on bottom of the disc 8. Alternatively, the frame 8 can incorporate the trim 16. The trim 16 can have a flat upper portion and a circular (cylindrical) bottom portion.

Heat sink 1 slides vertically against vertical track 2. FIG. 1 illustrates the heat sink 1 positioned at the highest receiver 6 on the vertical track 2 and at the highest position on the lower track 5, providing for maximal angle and elevation compared to disc 8 or frame 12.

Figure 2:
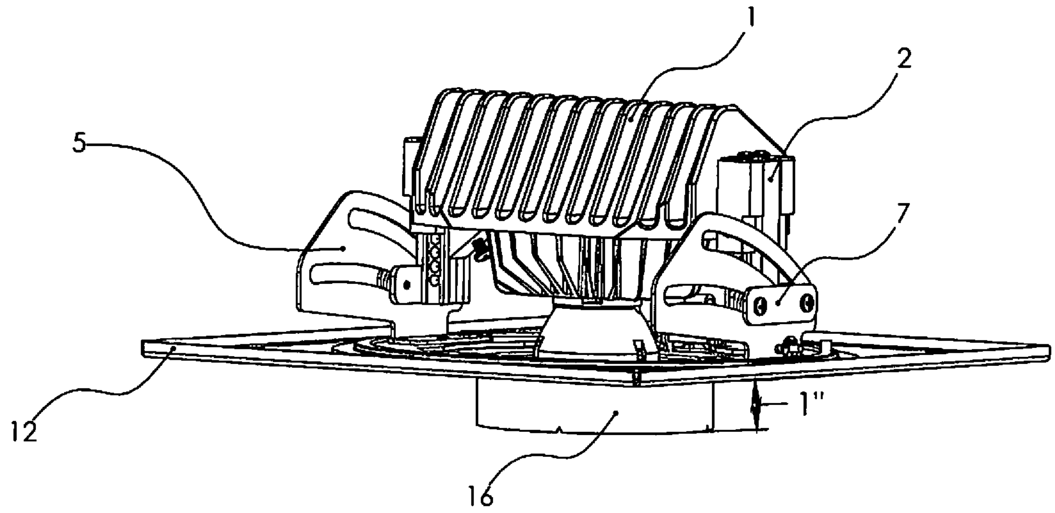
FIG. 2 illustrates a perspective view of the downlight without an angle and the lower portion of the optics housing at level of the frame.

FIG. 2 illustrates the position where the heat sink 1 has no angle (slider 7 is at bottom position of the track 5 and slider 7 is in horizontal position), and the heat sink 1 is at minimum position on the vertical track 2. In this position, the bottom of the optics housing 10 reaches approximately same level as the disc 8 or frame 12. A lens 13 and a reflector can be placed on the bottom of the optics housing 10.

Figure 3:
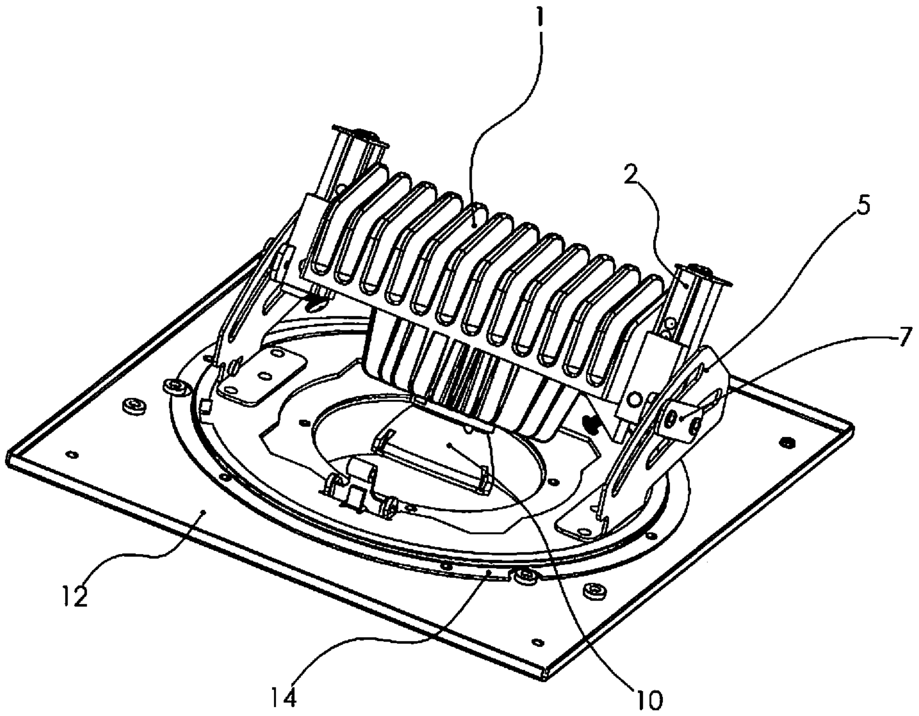
FIG. 3 illustrates a perspective view of the downlight.

FIG. 3 illustrates a position in between that of FIGS. 1 and 2. In this position, the slider 7 is slightly vertical. The heat sink 1 is at an angle. The optics housing 10 has an angle and projects light at an angle.

Figure 4:
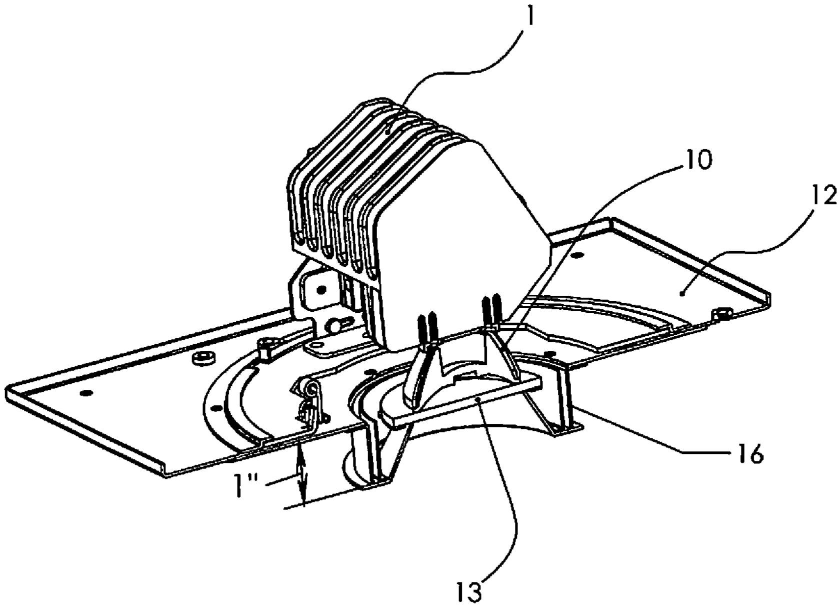
FIG. 4 illustrates a perspective view of the downlight with the optics housing being horizontal in orientation.

FIG. 4 is a cut-off view of the adjustable downlight. In this view, the optics housing 10 and the heat sink 1 are horizontally oriented. Illustrated in this view is lens 13, which is placed below the optics housing 10 in the ceiling. Lens 13 is attached to trim 16. In another embodiment, trim 16 does not have lens.

Figure 5:
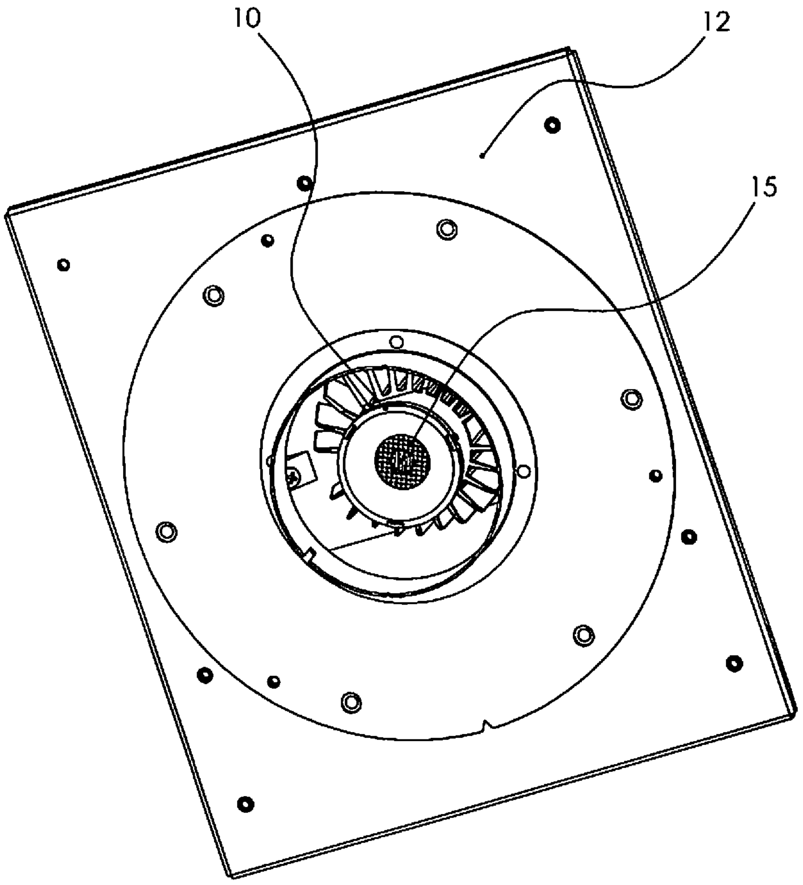
FIG. 5 illustrates a bottom perspective view through the aperture of the trim.

FIG. 5 illustrates a bottom view through the aperture of the trim. The optics housing 10 is illustrated at an angle compared to the aperture. The LED light source 15 inside of the optics housing 10 produces a directional light depending on the angle of the optics housing 10.

Figure 6:
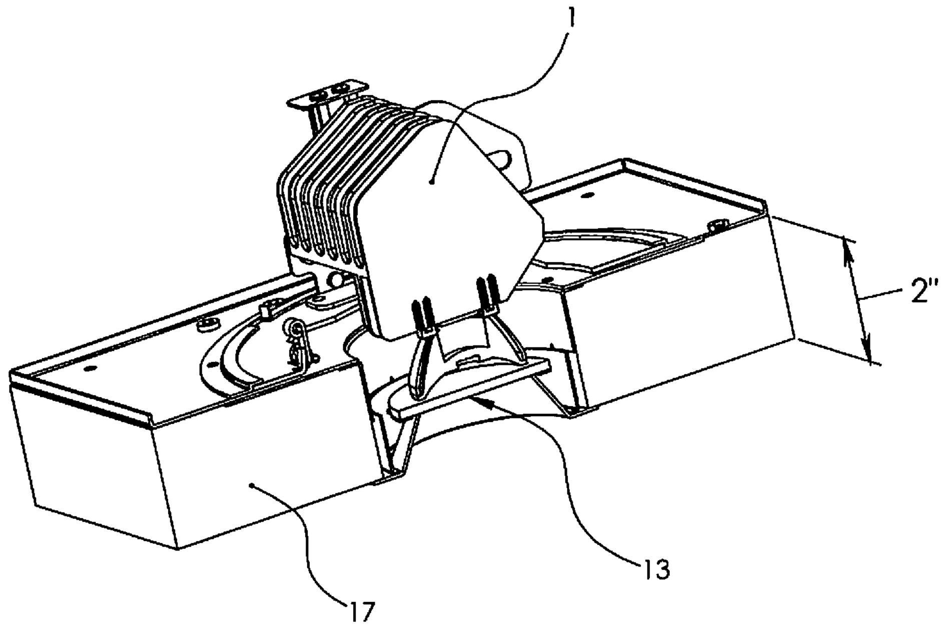
FIG. 6 illustrates the bottom of the optics housing extending one inch below the flat portion of the frame.
Figure 7:
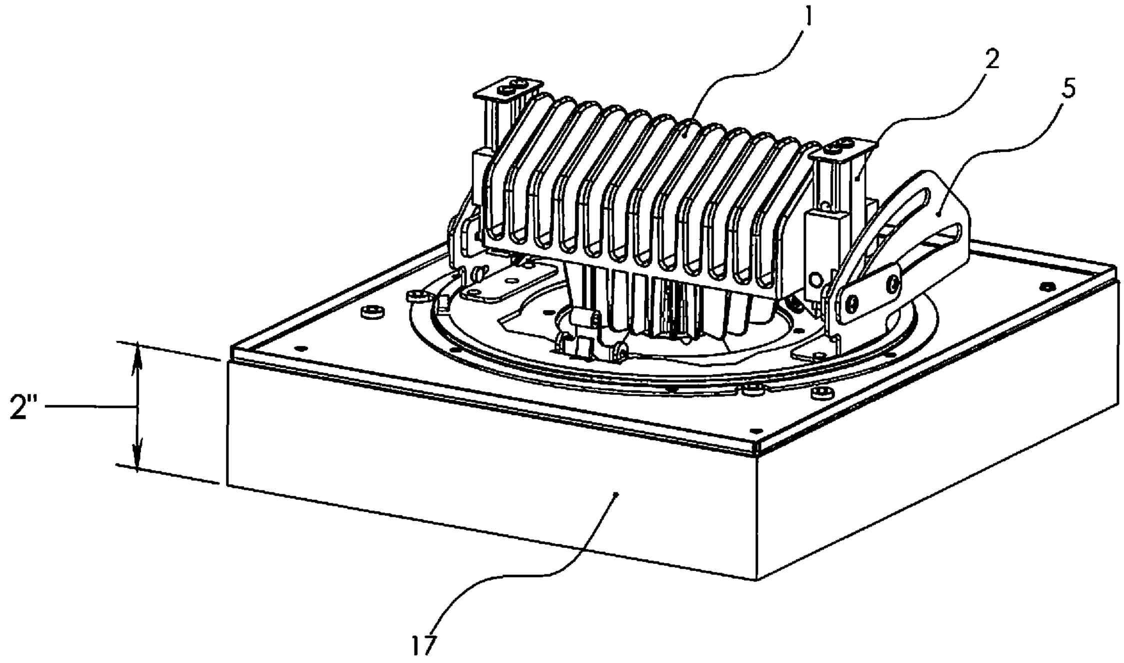
FIG. 7 illustrates the downlight of FIG. 1 installed on top of a ceiling.

FIGS. 6 and 7 illustrate the bottom of the optics housing 10 extending one inch below the flat portion of the disc 8/frame 12. The bottom of the optics housing 10 is in same position as bottom of trim 16. In the position, the slider 7 is on the bottom position of the lower track 5. Heat sink 1 is also on the bottom position of the vertical track 2. The bottom of the optics housing 10 extends one inch below the frame 23, and slightly below (0.1 cm to 0.5 cm) the circular portion of the trim 16. Lens 13 and a reflector can be placed directly below the optics housing 10 and attached to the optics housing 10 and/or the trim 16. When the ceiling has a thickness (such as two inches), the optics housing 10 can go inside the thickness of the ceiling for approximately one inch, minimizing production of an undesirable shadow.

The bottom of the optics housing 10 can extend slightly below the circular portion of the trim 12. In this position, the vertical track 2 is at its lowest position, and the slider 7 is at its lowest position. The circular portion of the trim 16 can cover the sides of the ceiling material, such as drywall or plywood.

Figure 8:
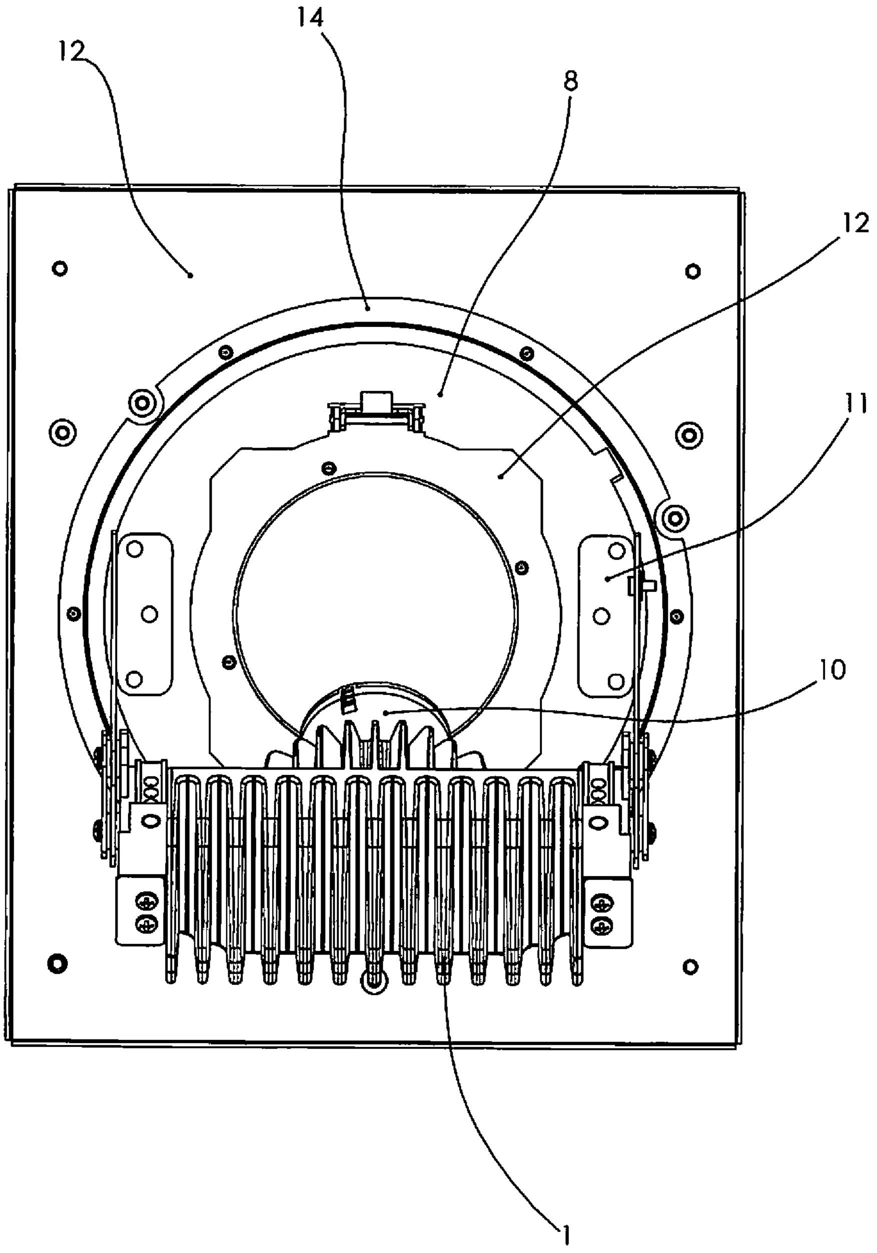
FIG. 8 illustrates a top view of the downlight.

FIG. 8 illustrates a top view of the downlight, with the optic housing 10 at an angle. Disc 8 is kept rotatably in place by ring 14. Disc 8 can rotate in both directions against frame 12. Anchor 11 is attached to frame 8. Heat sink 1 and optics housing 10 rotate with disc 8 in both directions. The downlight can be rotated 360 degrees.

REFERENCES

1. Heat sink
 1*a*—Upper portion of Heat sink
 1*b*—Lower portion of heat sink
2. Vertical track
3. Ball bearing
4. Receiver (vertical track)
5. Lower track
 5*a*. inner track
 5*b*. outer track
6. Receiver (lower track)
7. Slider
8. Disc
9. Aperture
10. Optics housing
11. Anchor
12. Trim
13. Lens
14. Ring
15. Light source
16. Trim
17. Ceiling material

What is claimed is:

1. A light fixture comprising:

a. an optics housing configured to receive a source of light;

b. a support for holding the optics housing in position;

c. a source of light inside of the optics housing;

d. a vertical track configured for the support to move along in a vertical direction;

e. an angled track attached to the vertical track and configured to move the support from a horizontal orientation to an angled orientation; and f. a frame with an aperture positioned below the support;

wherein position of the optics housing is configured to change relative to the aperture in a vertical direction and a vertical axis;

wherein the vertical and the angled track function independently from each other, allowing the bottom of the optics housing to move below the frame.

2. The downlight of claim 1, wherein the vertical track and the angled track are slidably attached to each other.

3. The downlight of claim 1, wherein the angled track has two tracks.

4. The downlight of claim 1, wherein the support is a heat sink.

5. The downlight of claim 1, wherein the vertical track has multiple positions for adjusting the position of the support.

6. The downlight of claim 1, wherein a bottom of the optics housing is configured to move below the frame by at least one inch.

7. The downlight of claim 1, wherein a bottom of the optics housing is configured to be positioned next to a ceiling material.

8. The downlight of claim 1, wherein the optics housing is configured to be positioned at zero to 40 degrees relative to the vertical.

9. The downlight of claim 1, further comprising attaching the support to a disc, the disc configured to allow the support to rotate 360 degrees.

10. The downlight of claim 1, further comprising a trim attached to the aperture of the frame.

11. The downlight of claim 1, wherein the support has an upper and the lower portion, with the vertical track attached to the upper portion, and the optics housing attached to the lower portion.

12. The downlight of claim 1, wherein the angled track is comprised of two tracks, the two tracks having different lengths and angles.

13. The downlight of claim 1, wherein the vertical track has receivers at fixed positions to receive a ball bearing.

14. The downlight of claim 1, wherein the angled track has an inner and an outer track that have different lengths.

15. The downlight of claim 1, wherein the angled track is anchored to a disc, the disc held in place by a ring and the optics housing configured to rotate in relation to the frame.

16. A downlight comprising:

a. an optics housing;

b. a source of light placed inside of the optics housing;

c. a heat sink attached to a top of the optics housing;

d. a vertical track attached on each side of the heat sink configured for the heat sink to move along in a vertical direction;

e. an angled track with an inner and an outer track attached to the vertical track, the vertical track configured to move along the angled track;

f. a disc attached to the angled track; and g. a frame with an aperture rotatably attached to the disc;

wherein the vertical and the angled track function independently from each other.

17. The downlight of claim 16, wherein a bottom of the optics housing is configured to be positioned above and below the frame by at least 0.5 inch.

18. The downlight of claim 16, wherein the vertical track and the heat sink are adjusted relative to each other with a ball bearing.

19. A downlight comprising:

a. an optics housing;

b. a source of light placed inside of the optics housing;

c. a support for holding the optics housing in position;

d. a first member configured for the support to move against in a vertical direction;

e. a second member configured to move the support from a horizontal orientation to an angled orientation; and f. a frame with an aperture positioned below the support;

wherein position of the optics housing is configured to change relative to the aperture;

wherein the first and the second member function independently from each other.

* * * * *